US012783049B2

(12) United States Patent
Yoo et al.

(10) Patent No.: US 12,783,049 B2
(45) Date of Patent: Nov. 3, 2026

(54) EFFECTOR FOR BRAIN COMPUTER INTERFACES

(71) Applicant: Synchron Australia Pty Limited, St Kilda East (AU)

(72) Inventors: Peter Eli Yoo, Dover, DE (US); Javed Gangjee, London (CA); James Bennett, Dover, DE (US); Madeline Montero, Dover, DE (US)

(73) Assignee: Synchron Australia Pty Limited

( * ) Notice: Subject to any disclaimer, the term of this patent is extended or adjusted under 35 U.S.C. 154(b) by 0 days.

(21) Appl. No.: 19/338,317

(22) Filed: Sep. 24, 2025

(65) Prior Publication Data

US 2026/0086640 A1 Mar. 26, 2026

Related U.S. Application Data

(60) Provisional application No. 63/699,027, filed on Sep. 25, 2024.

(51) Int. Cl.
*G06F 3/01* (2006.01)

(52) U.S. Cl.
CPC .................................... *G06F 3/015* (2013.01)

(58) Field of Classification Search
CPC ....................................................... G06F 3/015
See application file for complete search history.

(56) References Cited

U.S. PATENT DOCUMENTS

| | | | | |
|---|---|---|---|---|
| 11,093,038 | B2 * | 8/2021 | Yoo | G06F 3/015 |
| 11,625,014 | B2 * | 4/2023 | Oxley | A61B 5/4064 700/83 |
| 11,630,517 | B1 * | 4/2023 | Yoo | G06F 3/015 715/700 |
| 11,755,110 | B2 * | 9/2023 | Yoo | A61B 5/6868 345/156 |
| 12,032,345 | B2 * | 7/2024 | Oxley | G06F 3/015 |
| 2013/0138011 | A1 * | 5/2013 | Ang | A61B 5/375 600/545 |
| 2015/0141773 | A1 | 5/2015 | Einav et al. | |
| 2017/0043167 | A1 * | 2/2017 | Widge | A61B 6/037 |
| 2019/0025917 | A1 * | 1/2019 | Francis | G06N 3/0499 |
| 2021/0342004 | A1 * | 11/2021 | Yoo | A61B 5/24 |
| 2021/0353439 | A1 * | 11/2021 | Norman | A61F 2/70 |
| 2021/0365117 | A1 * | 11/2021 | Yoo | G06F 3/015 |
| 2023/0218198 | A1 * | 7/2023 | Bennett | G06F 3/015 600/544 |
| 2023/0253104 | A1 | 8/2023 | Serruya et al. | |
| 2023/0288987 | A1 * | 9/2023 | Yoo | G06F 3/0484 |
| 2024/0319791 | A1 * | 9/2024 | Yoo | G06F 3/0484 |

FOREIGN PATENT DOCUMENTS

WO WO 2026/072632 4/2026

* cited by examiner

*Primary Examiner* — Tadesse Hailu
(74) *Attorney, Agent, or Firm* — Holland & Hart LLP

(57) ABSTRACT

A standardized interface design pattern to simplify training and use of a brain-computer interface. Including methods and systems for assisting an individual using a brain-computer interface to produce a digital motor output to interact with an electronic device operatively coupled to the brain-computer interface.

28 Claims, 9 Drawing Sheets

EFFECTOR FOR BRAIN COMPUTER INTERFACES

CROSS-REFERENCE TO RELATED APPLICATIONS

This application is a non-provisional of U.S. Provisional application no. 63/699,027 filed on Sep. 25, 2024, the entirety of which is incorporated by reference.

FIELD OF THE INVENTION

A standardized interface design pattern to simplify training and use of a brain-computer interface.

BACKGROUND OF THE INVENTION

Training individuals to use a brain-computer interface ("BCI") can be very cognitively taxing for the individual because the training requires intense concentration. This is especially exacerbated during extended training or use. Moreover, the individual may already be in a very distracting environment, such as a hospital with a lot of background noise or at home with periodic interruptions for daily care. The overall lack of focus reduces the quality and accuracy of the decoder, compromising the effectiveness of the interaction model.

The tasks involved in training and use of the BCI can also require the BCI user to perform abstract attempts of movement (e.g., thoughts of contracting or moving a muscle) at very precise time intervals, starting and stopping on cue. This level of rigidity requires the user interface ("UI") to convey instructions clearly enough for the user to interpret them in real time, without providing any feedback on performance.

Presently, most BCIs are limited to clinical settings, primarily due to their complexity. In those cases, a field clinical engineer must be present to walk the user through every task. Such requirements limit the commercialization of the technology.

The development of brain-computer-interface ("BCI") technologies presently focuses both on safety and enabling people living with full or partial paralysis or with limited/decreasing motor ability to use a BCI system to control electronic devices, including prosthetic arms and computers, and to complete a variety of daily tasks. There is a need to restore continuous and independent motor outputs that allow for BCI control of devices by the BCI user. BCI systems hold promise for restoring lost neurologic function, including motor neuroprostheses (MNPs), to restore motor capability to the individual. An MNP can directly infer motor, or other intent, by detecting local brain signals and transmitting the motor control signal from the brain to generate a motor output, referred to as a digital motor output (DMO), which can subsequently control computer actions or control other electronic devices. In one variation, this physiological function can be performed by the motor neurons in the individual. The MNPs can be implanted, either directly placed on/in brain tissue or intravascular devices. Alternatively, or in combination, the entirety or a portion of an MNP can be externally positioned.

The tasks that the participant must perform are visually distinct from each other. The front-end representation of these tasks would vary significantly when created independently. Users with disabilities are different from each other, making static interfaces hard to implement due to the need for customization.

There remains a need to provide a user interface to improve ease and efficiency for a user operating a BCI.

SUMMARY OF THE INVENTION

The present invention provides a user interface that is configurable to every BCI user, based on that user's unique motor abilities, different types of impairments, as well as the range of different needs, strengths, and limitations.

The effector is a scanning selection interface and/or a movable cursor controlled by the user's neural output. The effector can be a physical piece of hardware or a virtual user interface object that is controlled by the decoder and that interacts with the environment. The effector could be a software pointer, an auto scanner, a manual scanner, a virtual keyboard selector, a one-dimensional cursor, a point-and-click cursor, or a physical device, in each case controlled by brain signals.

In one embodiment, the effector might be actuated by a combination of brain input and another input modality, such as eye-tracking or a physical switch.

In another embodiment of a BCI system using an effector, the BCI system can automatically calibrate and personalize an effector for the user through an iterative training sequence. Such automatic calibration can be used for automated user onboarding and training, where the system itself guides the user through learning to use the BCI with minimal intervention by another person, whether a caregiver, clinician, occupational therapist, or field clinical engineer. For example, the software can present visual instructions for a specific neural effector pattern, prompt the user to perform and repeat that mental action, automatically train a personalized decoder on the fly, and then test the new decoder by letting the patient control a simple tile board (see for example figure No.1). All of this can occur autonomously (the patient follows on-screen prompts and the system adapts), creating a personalized digital motor output (DMO) without a technician manually tuning the system.

The effector can be an expression of an adaptive decoder, where a BCI's processor can adjust sampling or data transmission such that brain-to-output latency stays below a certain threshold (such as <xx seconds from the time of intent to DMO). In this way, a BCI system can optimize itself over time by adjusting parameters or switching algorithms to improve speed and accuracy for a given effector control task.

The configurable BCI user interface is based on a modular UI pattern that allows the system to generate multiple interface styles from a common template or library of different effector interfaces, simply by changing the effector (defined in the next section) configuration. The change of the effector configuration can be sent from a processor through Bluetooth (BLE) or other wireless or wired communication protocol. In practice, this means a wide range of UI control methods can be supported with the same underlying code, and thereby provide a plurality of user-selectable effector modes for controlling external applications, each mode comprising a different interaction method (e.g., scanning selection, direct cursor control, etc.).

The configurable effector modalities support different BCI user needs. Some users may need a scanning interface where the system cycles through options (the effector automatically moves a highlight and the user selects by thought), while other users may prefer direct continuous control of a pointer.

Variations of the present disclosure include methods for assisting an individual using a brain-computer interface to produce a digital motor output to interact with an electronic device operatively coupled to the brain-computer interface. In one variation, the method includes providing a visual display to the individual on a user interface of the brain-computer interface; displaying a digital effector on the visual display, where the digital effector includes an informational graphic and a timing indicator, and; positioning a target graphic on or adjacent to an orbit path of the informational graphic; moving the timing indicator relative to the orbit path while maintaining the target graphic stationary relative to the digital effector; producing the digital motor output when both the timing indicator aligns with the target graphic and the brain-computer interface detects an intentional brain signal from the individual; and transmitting the digital motor output to the electronic device. The effector can be generated by a processing unit on the BCI. Alternatively, or in combination, the BCI can rely on an external processor (e.g., an external electronic device) that can generate the effector and determine when to send/issue/transmit the DMO either by using the DMO to effect a change in a computer housing the external processor or in a different electronic device.

Variations of the present disclosure can also include a brain-computer interface or system for enabling an individual to produce a digital motor output to interact with an electronic device operatively coupled to the brain-computer interface. The brain-computer interface or system can include: a visual display to the individual on a user interface of the brain-computer interface; where the brain-computer interface is configured to display a digital effector on the visual display, where the digital effector includes an informational graphic and a timing indicator, and; wherein the brain-computer interface positions a target graphic on or adjacent to an orbit path of the informational graphic and moves the timing indicator relative to the orbit path while maintaining the target graphic stationary relative to the digital effector; wherein when both the timing indicator aligns with the target graphic and the brain-computer interface detects an intentional brain signal from the individual, the brain-computer interface produces a digital motor output and transmits the digital motor output to the electronic device.

Variations of the present disclosure include methods or systems where the orbit path of the informational graphic is spaced a distance from a perimeter of the informational graphic. The target graphic can comprise a visual representation of the orbit path.

Variations of the present disclosure include methods or systems, where the timing indicator includes a single digital image that rotates along the orbit path. The single digital image can also orbit about the informational graphic by moving along the orbit path.

The timing indicator can include a continuous digital image that sweeps about the informational graphic. Alternatively, or in combination, the timing indicator can expand radially from the informational graphic.

The methods can further include a non-target graphic displayed on or adjacent to the digital effector such that the non-target graphic will not produce a digital motor output.

Variations of the present disclosure include methods or systems, wherein further including converting the non-target graphic to the target graphic.

Variations of the present disclosure include methods or systems, wherein the informational graphic includes a circular outline.

Variations of the present disclosure include methods or systems, wherein the informational graphic includes a non-circular outline.

Variations of the present disclosure include methods or systems, wherein the digital effector is part of a plurality of digital effectors, where the plurality of digital effectors are displayed on the visual display.

Variations of the present disclosure include methods or systems, where the informational graphic includes a text, an icon, or an image.

Variations of the present disclosure include methods or systems, where the digital effector moves relative to the user interface.

Variations of the present disclosure include methods or systems, where the digital effector is stationary on the user interface.

Variations of the present disclosure include a brain-computer interface for enabling an individual to produce a digital motor output to interact with an electronic device operatively coupled to the brain-computer interface, the brain-computer interface including: a visual display to the individual on a user interface of the brain-computer interface; where the brain-computer interface is configured to display a digital effector on the visual display, where the digital effector includes an informational graphic and a timing indicator, and; wherein the brain-computer interface positions a target graphic on or adjacent to an orbit path of the informational graphic and moves the timing indicator relative to the orbit path while maintaining the target graphic stationary relative to the digital effector; wherein when both the timing indicator aligns with the target graphic and the brain-computer interface detects an intentional brain signal from the individual, the brain-computer interface produces a digital motor output and transmits the digital motor output to the electronic device.

Variations of the present disclosure include a brain-computer interface, where the orbit path of the informational graphic is spaced a distance from a perimeter of the informational graphic.

Variations of the present disclosure include a brain-computer interface, where the target graphic includes a visual representation of the orbit path.

Variations of the present disclosure include a brain-computer interface, where the timing indicator includes a single digital image that rotates along the orbit path.

Variations of the present disclosure include a brain-computer interface, where the timing indicator includes a continuous digital image that sweeps about the informational graphic.

Variations of the present disclosure include a brain-computer interface, where the timing indicator expands radially from the informational graphic.

Variations of the present disclosure include a brain-computer interface, further including a non-target graphic displayed on or adjacent to the digital effector such that the non-target graphic will not produce a digital motor output.

Variations of the present disclosure include a brain-computer interface, wherein further including converting the non-target graphic to the target graphic.

Variations of the present disclosure include a brain-computer interface, wherein the informational graphic includes a circular outline.

Variations of the present disclosure include a brain-computer interface, wherein the informational graphic includes a non-circular outline.

Variations of the present disclosure include a brain-computer interface, wherein the digital effector is part of a plurality of digital effectors, where the plurality of digital effectors are displayed on the visual display.

Variations of the present disclosure include a brain-computer interface, where the informational graphic includes a text, an icon, or an image.

The present disclosure can also include methods for assisting an individual using a brain-computer interface to produce a plurality of digital motor outputs to interact with one or more electronic devices operatively coupled to the brain-computer interface. For example, such a method can include providing a visual display to the individual on a user interface of the brain-computer interface; displaying plurality of digital effectors on the visual display, where each of the plurality of digital effectors includes an informational graphic and a timing indicator, and; positioning a target graphic on or adjacent to an orbit path of the informational graphic; for at least one digital effector of the plurality of digital effectors, moving the timing indicator relative to the orbit path while maintaining the target graphic stationary relative to the at least one digital effector; producing a unique digital motor output when both the timing indicator aligns with the target graphic and the brain-computer interface detects an intentional brain signal from the individual; and transmitting the unique digital motor output associated with the at least one digital effector to the one or more electronic devices.

DETAILED DESCRIPTION

Figure 1A:
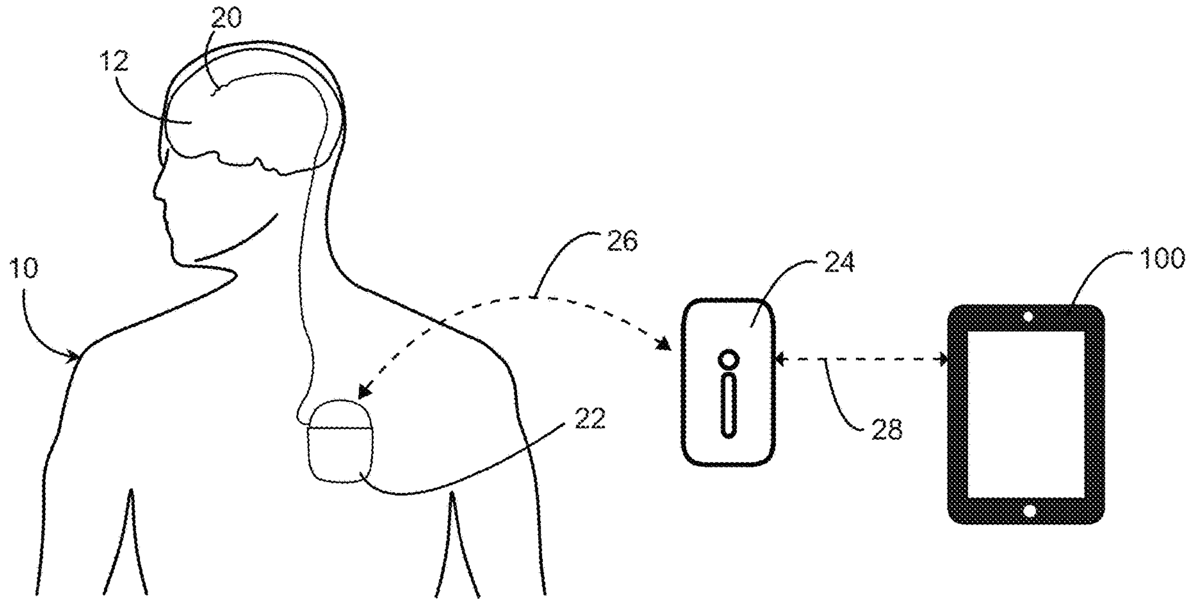
FIG. 1A illustrates an example of an individual using a BCI system
Figure 1B:
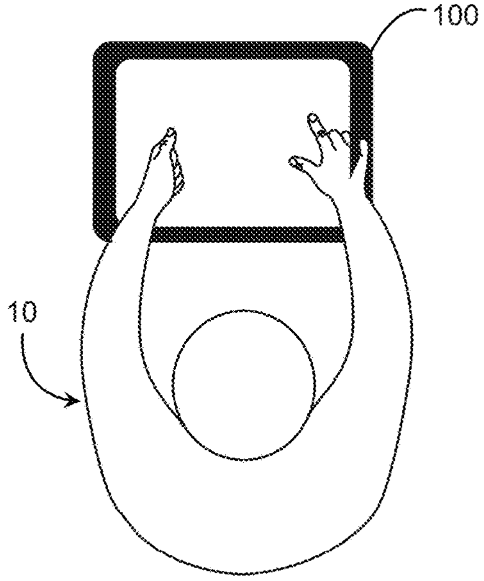
FIG. 1B illustrates an example of an electrode associated with a BCI system.

FIG. 1A illustrates an example of an individual 10 using a BCI system that includes one or more electrodes 20 that detect neural signals from the individual 10 that are transmitted 26 by one or more components 22, 24 to ultimately connect 28 with an electronic device 100, which can also be an electronic assistive device having a user interface. Non-limiting examples of electronic devices include consumer electronics, an end device and/or any human interface device (HID) 134 such as a smartphone, tablet, computer, prosthetics, household smart devices, etc. The purpose of the improved BCI system is to increase the usability of the BCI system for a wider group of users with varying levels of BCI control. While FIG. 1B illustrates the electrode 20 implanted within the individual 10. The concepts of this disclosure can be applied to any type of BCI, including surgically implanted electrodes, electrodes that are positioned exterior to the body, electrodes that are directly implanted in brain tissue, and/or electrodes that are placed over tissue within the skull, etc. In addition, as shown in FIG. 1B, the concepts disclosed herein can be accessed directly on a user interface by an individual 10 either in combination with a BCI or apart from a BCI.

Figure 2A:
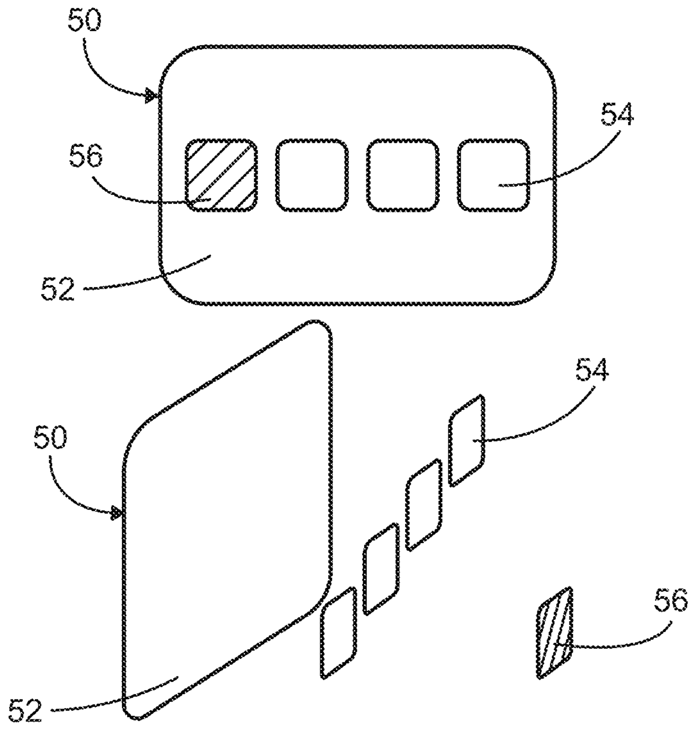
FIGS. 2A and 2B illustrate a variation of a user interface to demonstrate the various components, including a substrate, elements, and an effector.
Figure 2B:
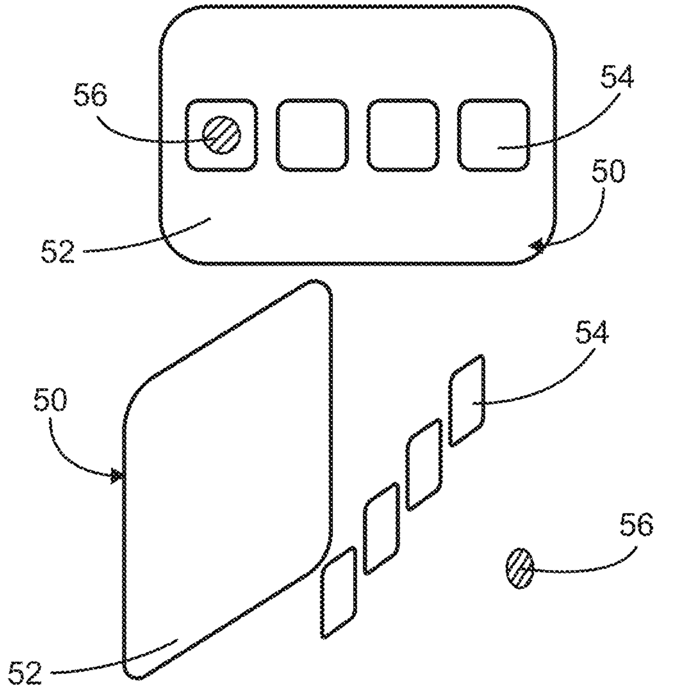

FIGS. 2A and 2B illustrate a variation of a user interface 50 to demonstrate the various components, including a substrate 52, elements 54, and an effector 56. In one variation, an element is a unit of the UI designed for interaction with the user by an effector, such as tiles on a communication board or icons on a desktop. Configurable parameters of the element can include: shape-radial or tile; size-radius (radial), width and height (tile); location-upper left x & y, lower right x & y; background color; background image; border color; text; and indicator-when more than one element in use shows the icon of the action. The substrate serves as the backdrop upon which the elements are displayed. They can organize a group of elements.

An effector is similar to the effector used in robotics, where a mechanism carries out desired movements based on the inputs it receives. In the case of the BCI, the user controls the digital interface with their effector in a similar manner. The effector's design and the way in which it interacts with the backend are a significant improvement over conventional BCI interfaces. During training, the effector informs the user about the status of the task and the actions that need to be performed. Once a decoder is calibrated and made available for use, the effector then consumes the instructions from the user to navigate the screen, make selections, and manipulate elements. As the stimulus on the screen changes, the effector continuously keeps the backend informed of the context of the user's actions.

FIGS. 2A and 2B are intended to show a conceptual user electronic interface 50 to illustrate a substrate 52, elements 54, and an example of an effector 56 as fundamental layers of the BCI user electronic interface 50. In this variation, the substrate 52 is the background of the user interface 50, elements 54 are interactive UI components on the substrate 52, and the effector 56 is a UI control mechanism that permits the user navigate the user interface 50, select, and manipulate elements 54 that will generally trigger a command in an electronic device (not shown) that is part of or coupled to the BCI. In the variation shown in FIG. 2A, the effector 56 can simply comprise a visual identification of the active element 54. For example, once an element 54 is identified by the effector 56 to be active, the user can select this active element using a brain signal. By selecting that active element 54, the user causes the BCI to generate an output corresponding to that active element. This output is considered a digital motor output (DMO) as it allows the user to interact with the electronic device that is part of or coupled to the BCI. FIG. 2B is similar to the variation of FIG. 2A, with the exception being that the effector is in the shape of a circle. In both variations, the effector 56 scans over the elements 54 to allow the user to select the appropriate element 54.

The way the effector interacts with the elements on the substrate depends on the interaction method. Switch scanning refers to when the effector automatically scans across the available elements, changing its position. Alternatively, the elements can scan or move across the effector. In either case, the user has the option to decide which action to perform with the effector at a given position. Position control refers to when the effector's position on the screen and the action to perform at the desired position are both determined by the user.

In some variations, an effector 56 can be any visual distinguishing feature that identifies an element 54 as being active, meaning that any action taken by the BCI user will select or activate the active element. By providing a means to implement this pattern using a unified GUI canvas, it allows quick design and build calibration, training, and utilization tasks for participants, where the GUI is cohesive and intuitive to use.

This electronic canvas and the way the layers interact with each other and the BCI decoder address the problems discussed above. Using the same components consistently to represent the task reduces the mental effort required to learn and adapt to subsequent interfaces that are new to the participant. The clarity provided by this standardization also reduces the need for a caregiver or field clinical engineer to provide explanations for new tasks.

Documentation, training, and technical support that is based on established conventions would also provide for easier assistance. From the lens of accessibility, custom components that are reused make it easier to adhere to guidelines such as Web Content Accessibility Guidelines (WCAG) by reducing the number of assets required.

Synchronous: For a 1 Degree-of-Freedom (DoF) timed decoder, the signal provided by the BCI user is a digital motor output (DMO) and is a binary signal during a specified timing window. Therefore, the decoder is only responsible for instructing the effector to make the selection, along with passing along the timing information. The front-end steps in to take care of the traversal of elements based on the tabbing order.

Asynchronous: For a 1 DOF free decoder, the DMO only outputs the binary signal without timing and informs the effector of the traversal command. The front end is responsible for tabbing order and performs selections when instructed.

Control: For 1D or 2D control, the effector can be free-floating like a mouse cursor. The backend informs the front end of both navigation and selection. The front end simply takes care of the order of elements.

Figure 3A:
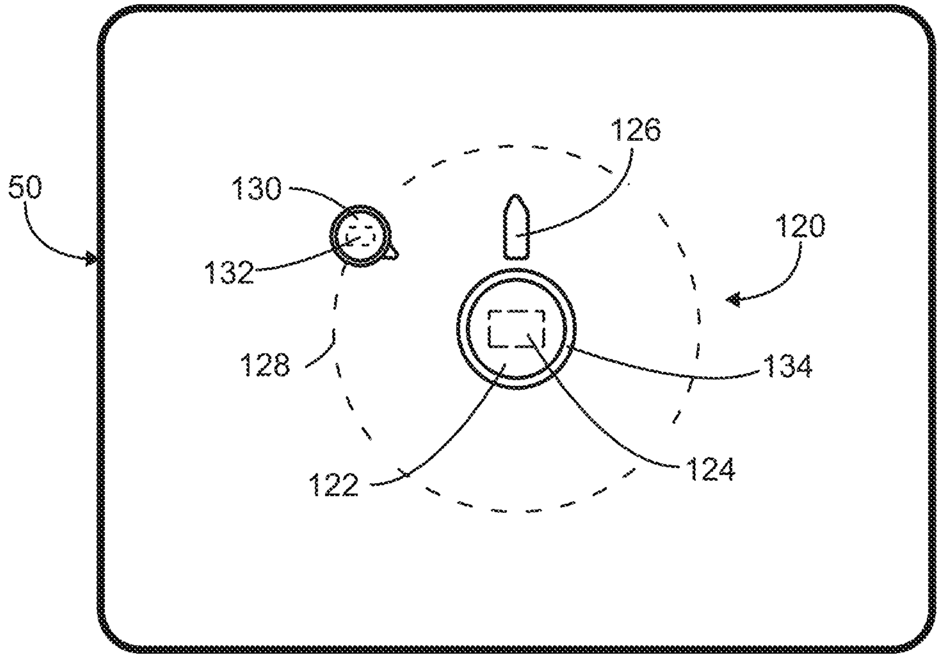
FIG. 3A shows another variation of a digital effector configuration that follows the theme of an informational graphic at the center of the digital effector.

FIG. 3A shows another variation of a digital effector configuration 120 that follows the theme of an informational graphic 122 at the center of the digital effector 120. Typically, the informational graphic 122 includes text, an icon, an image, or other representation 124 to provide a cue to the user on how to generate the brain signal to operate the digital effector 120. The informational graphic 122 can have the primary information given to the user. This could be in the form of an instruction to prompt them to perform an action or display a state. The information can be provided with color, text, an icon, or any combination thereof. It is also noted that the digital effector 120 can be stationary on the user interface 50, or it can sweep/scan across the user interface. In additional variations, the digital effector 120 can randomly move on the user interface.

The effector 120 also includes one or more timing indicators 126 that move about the informational graphic 122. As described below, the timing indicator 126 moves about the informational graphic 122 relative to a path or orbit 128 of the informational graphic. The effector 120 also includes one or more target graphics 130 that are positioned about or adjacent to the orbit path 128 of the informational graphic. The orbit path 128 can be visible (i.e., represented by a digital image such as a line, circle, etc. Alternatively, all or a portion of the orbit path can remain hidden. In yet additional variations, the orbit path 128 can comprise various closed paths other than a circle, e.g., a square, rectangle, triangle, figure-8, etc. The orbit path 128 can serve as the boundary of the effector 120, used either to contain the elements of the effector or display information about the effector's location with respect to the screen. Additional variations can include effectors with multiple orbits. Like the informational graphic 122, the target graphic 130 can comprise text, an icon, an image, or other representation 132 to provide a cue to the user for the resulting DMO or other information. In additional variations, the target graphic 130 and/or the informational graphic can comprise color alone.

The arrangement of this variation of the effector is similar to that of a celestial body, such as a planet, atmosphere, belt, and orbit, along with timing dials. By borrowing the look of the effector's basic components across the BCI interface, the interface can comprise a consistent design to allow the user to quickly understand the task, while setting the user up for success during the utilization phase.

The effector 120 of FIG. 3A can also include additional features, such as a secondary indicator 134 about the informational graphic 122. In some variations, the secondary indicator 134 is a decorative component to distinguish the informational graphic 122. However, in additional variations, the secondary indicator 134 can change color and fill to be configurable to convey additional information, such as state, timing, or additional information.

Figure 3B:
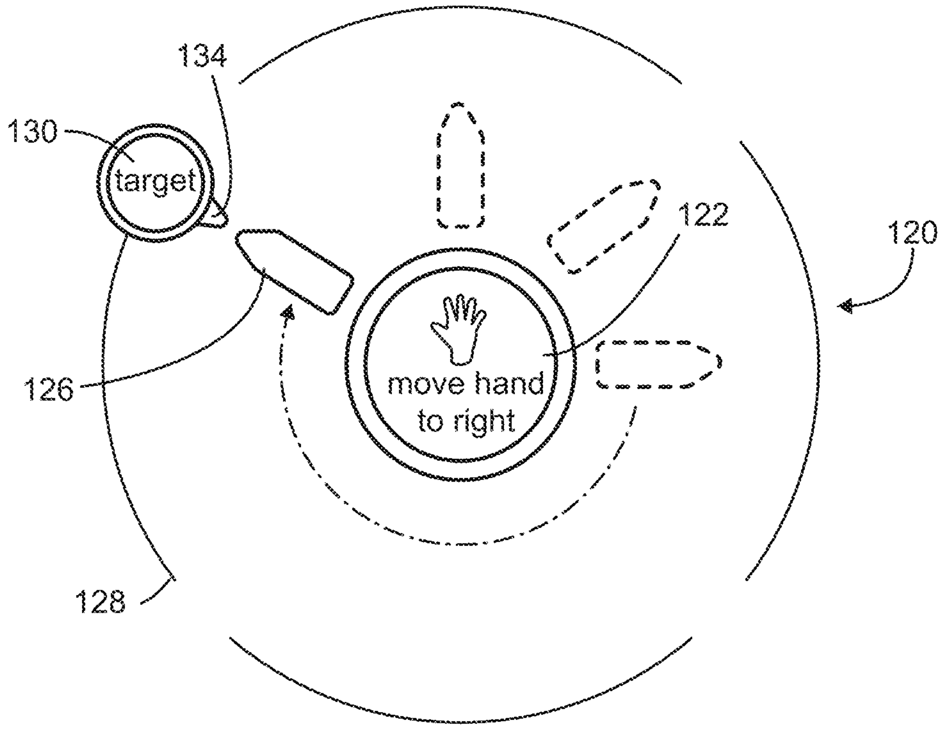
FIG. 3B illustrates a variation of a digital effector having a timing indicator that rotates about an informational graphic by moving relative to an orbit path of the informational graphic.

FIG. 3B illustrates a variation of a digital effector 120 similar to the one shown in FIG. 3A. In this variation, the timing indicator 126 rotates about the informational graphic 122 by moving relative to the orbit path 128 to allow the user to monitor the indicator 126 until it is in alignment with the target graphic 130. When in alignment (or as the indicator 126) approaches the target graphic 130, the user can produce an intentional brain signal. In the illustrated variation, the informational graphic 122 instructs the user to move their hand to the right. In those cases where the individual is motor-impaired, the individual produces a thought of moving their hand to the right. The BCI will then produce a digital motor output (as indicated by the target graphic 134) when both the timing indicator 126 aligns with the target graphic 130 and the brain-computer interface detects an intentional brain signal from the individual. In some variations, the effector 130 can also include a feature 134 to assist in alignment of the indicator 126 and the target graphic 130. Variations of the effector 120 also allow for coloring, filling, or otherwise visually altering any of the effector 120 components to indicate that the selection was successful.

Figure 4A:
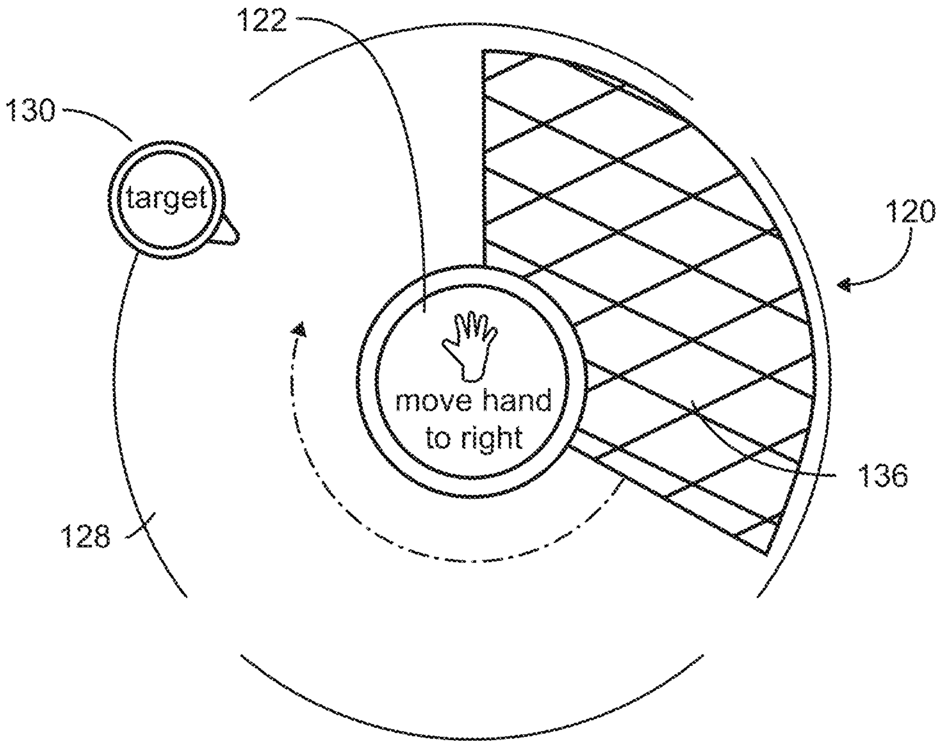
FIG. 4A shows another variation of a digital effector that uses a belt-type indicator that fills or sweeps over the region adjacent to the orbit path of the effector.
Figure 4B:
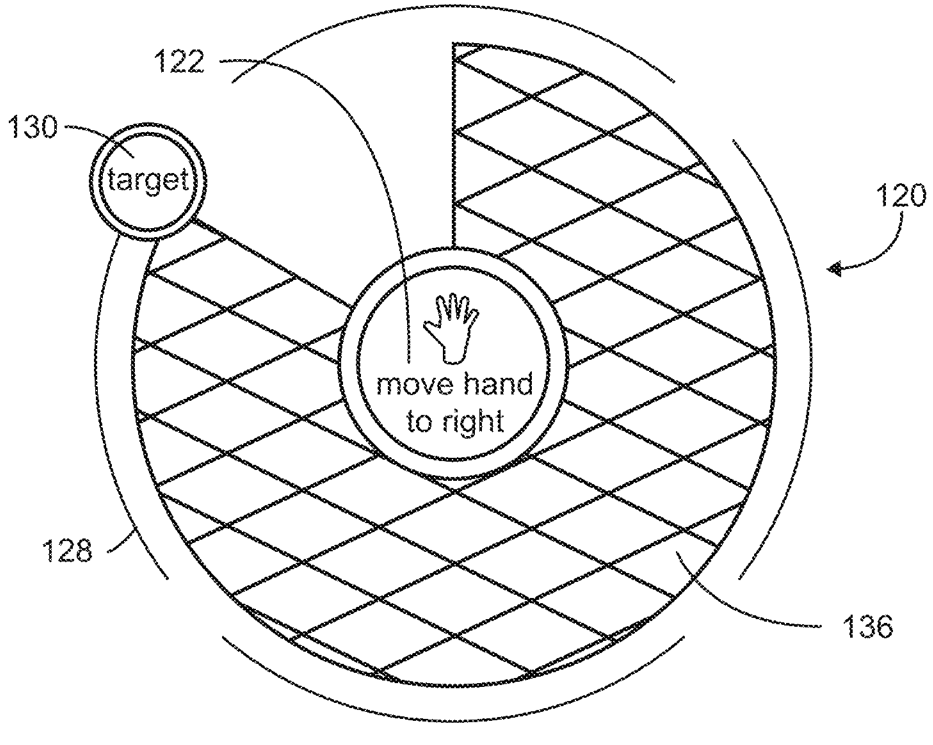
FIG. 4B shows the belt filling the region adjacent to the orbit path until it reaches the target graphic.
Figure 4C:
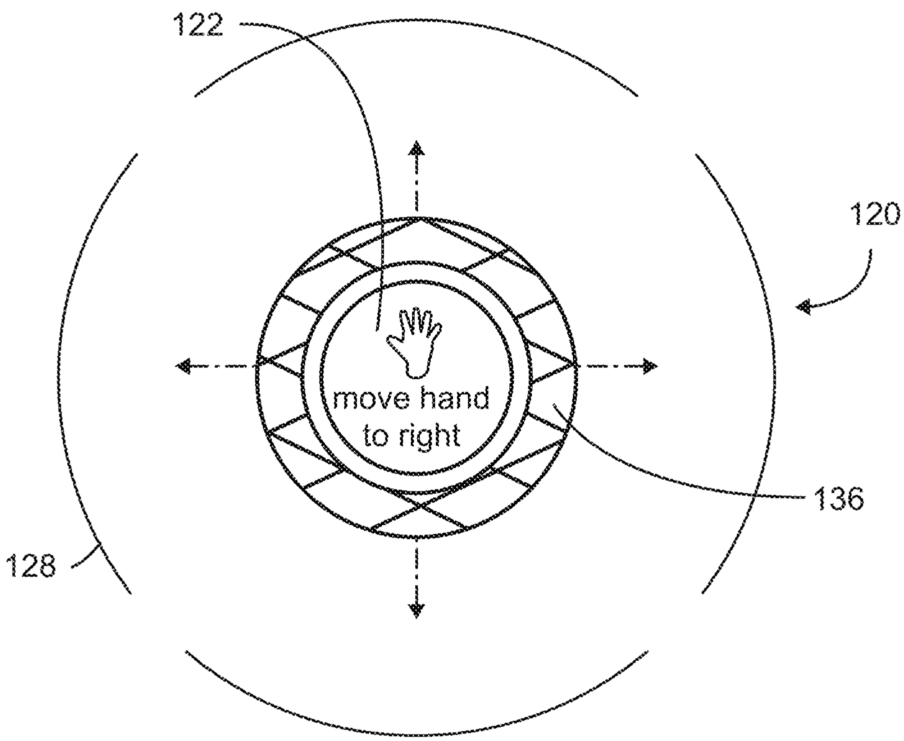
FIGS. 4C and 4D illustrate a variation where the belt-type indicator radially expands from the informational graphic until it approaches or reaches the orbit path.
Figure 4D:
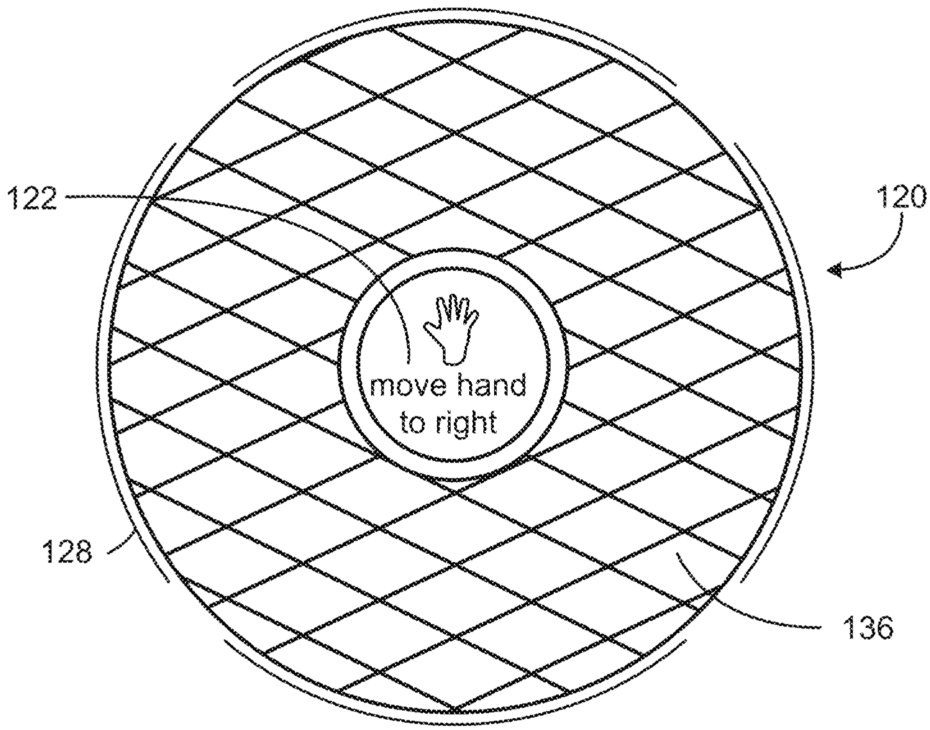

FIG. 4A shows another variation of a digital effector 120 that uses a belt-type indicator 136 that fills or sweeps over the region adjacent to the orbit path 128 of the effector 120. FIG. 4B shows the belt filling the region adjacent to the orbit path 128 until it reaches the target graphic 130. The belt indicator 136 can be used in multiple ways. For example, it can act as a progress bar, giving users an idea of how much time is left in the current action or until their selection is finalized. Alternatively, or in combination, the belt indicator can be pulsing, with oscillating size variations to prompt the user to take a repeated action. For example, FIG. 4C illustrates a variation where the belt-type indicator 136 radially expands from the informational graphic 122 until it approaches or reaches the orbit path 128, as shown in FIG. 4D. In this variation, an outline of the orbit path 122 can function as a target graphic. Meaning that the individual will observe the belt-type indicator 136 approaching the orbit path 128 and generate a neural signal that allows the BCI to generate the DMO. The dial can be used to indicate the direction of the effector's movement or selection.

Figure 5A:
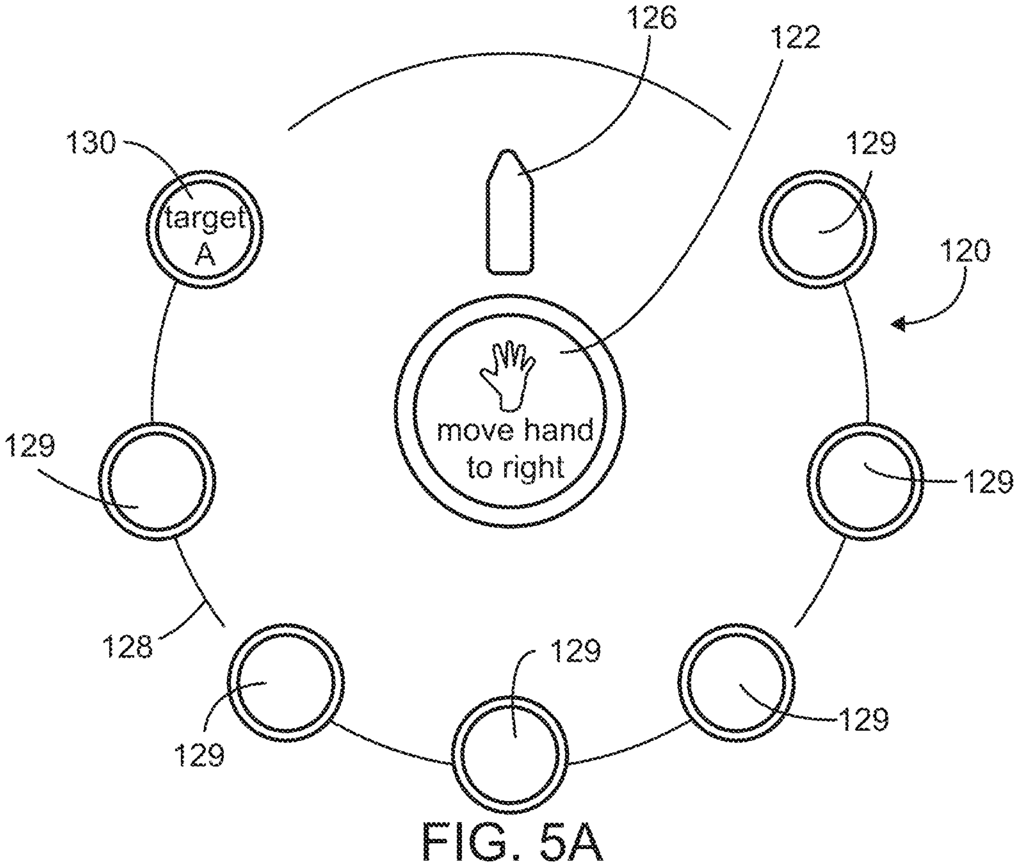
FIGS. 5A and 5B show an additional variation of a digital effector that includes one or more targeted graphics and a number of non-target graphics, which will cause no action to be taken if the user selects the non-target graphics.
Figure 5B:
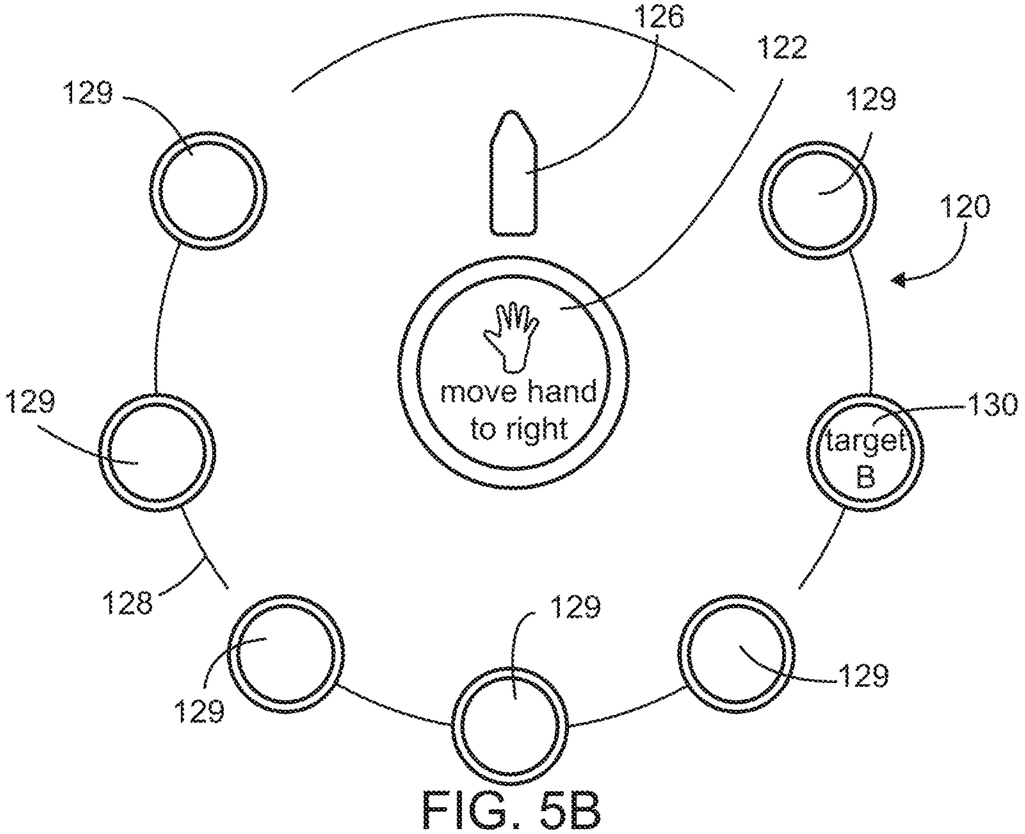

FIGS. 5A and 5B show an additional variation of a digital effector 120 that includes one or more targeted graphics 130 and a number of non-target graphics 129, which will cause no action to be taken if the user selects the non-target graphics 129. FIG. 5B shows that various non-target graphics 129 can be made or converted into a target graphics 130 in the same effector 120. Moreover, any number of non-target graphics 129 or target graphics 130 can be positioned about an orbit path 128 of the informational graphic 122. Additional variations of the effector 120 can include a target graphic 130 that is located within, on, or exterior to the orbit path 128.

Figure 6A:
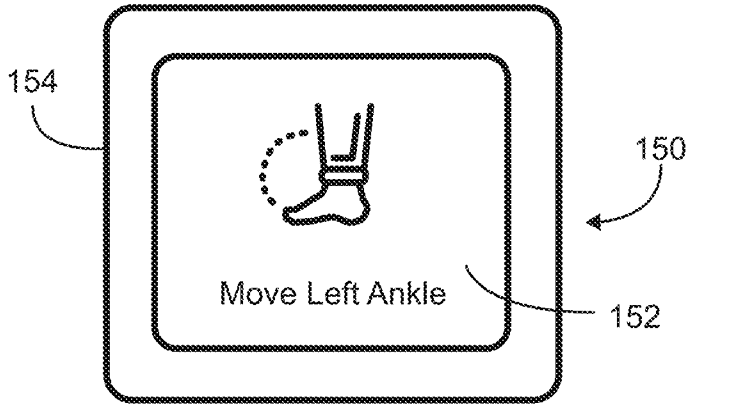
FIGS. 6A to 6C show another variation of a digital effector having an informational graphic and an orbit path where the effector comprises a tile display shape.
Figure 6B:
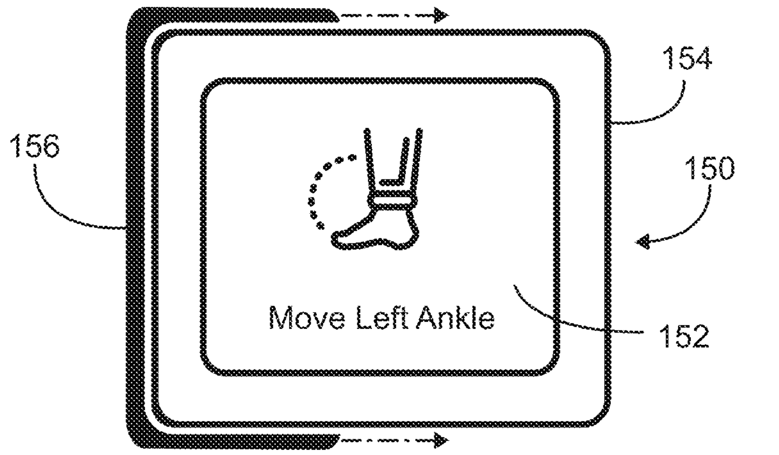
Figure 6C:
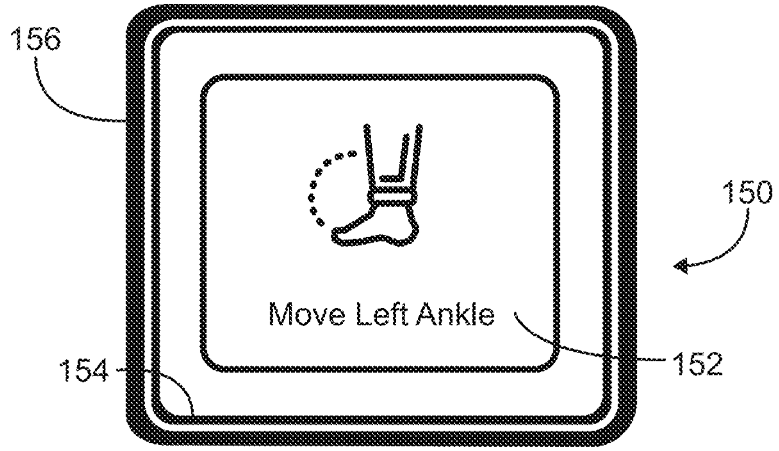

FIGS. 6A to 6C show another variation of a digital effector 150 having an informational graphic 152 and an orbit path 154, where the effector 150 comprises a tile display shape rather than the radial shapes provided above. The shape of the effector can be defined by the mode of interaction and the shape of the elements that can be controlled. It is either meant to be floating above the elements (in Control mode) or wrapping around the element (in synchronous or asynchronous mode) to display additional visual cues to assist the user in making selections. FIG. 6A shows the effector 150 without a timing indicator. The timing indicator is shown in FIG. 6B starts to cover the orbit path 154 moving in a lateral direction. In this variation, the orbit path 154 is visible and essentially functions as a target graphic. This action can be triggered by the user generating the instruction of the informational graphic 152 (e.g., a thought or action of moving the left ankle). The effector 150 will be displayed on a user interface as the timing indicator 156 eventually fully or partially surrounds the orbit path 154. Once the timing indicator 156 reaches a certain point (e.g., fully covers or partially covers the orbit path 154), the BCI will determine that the timing indicator 156 aligns with the target graphic (e.g., the visible orbit path 154) to produce a digital motor output.

Figure 7A:
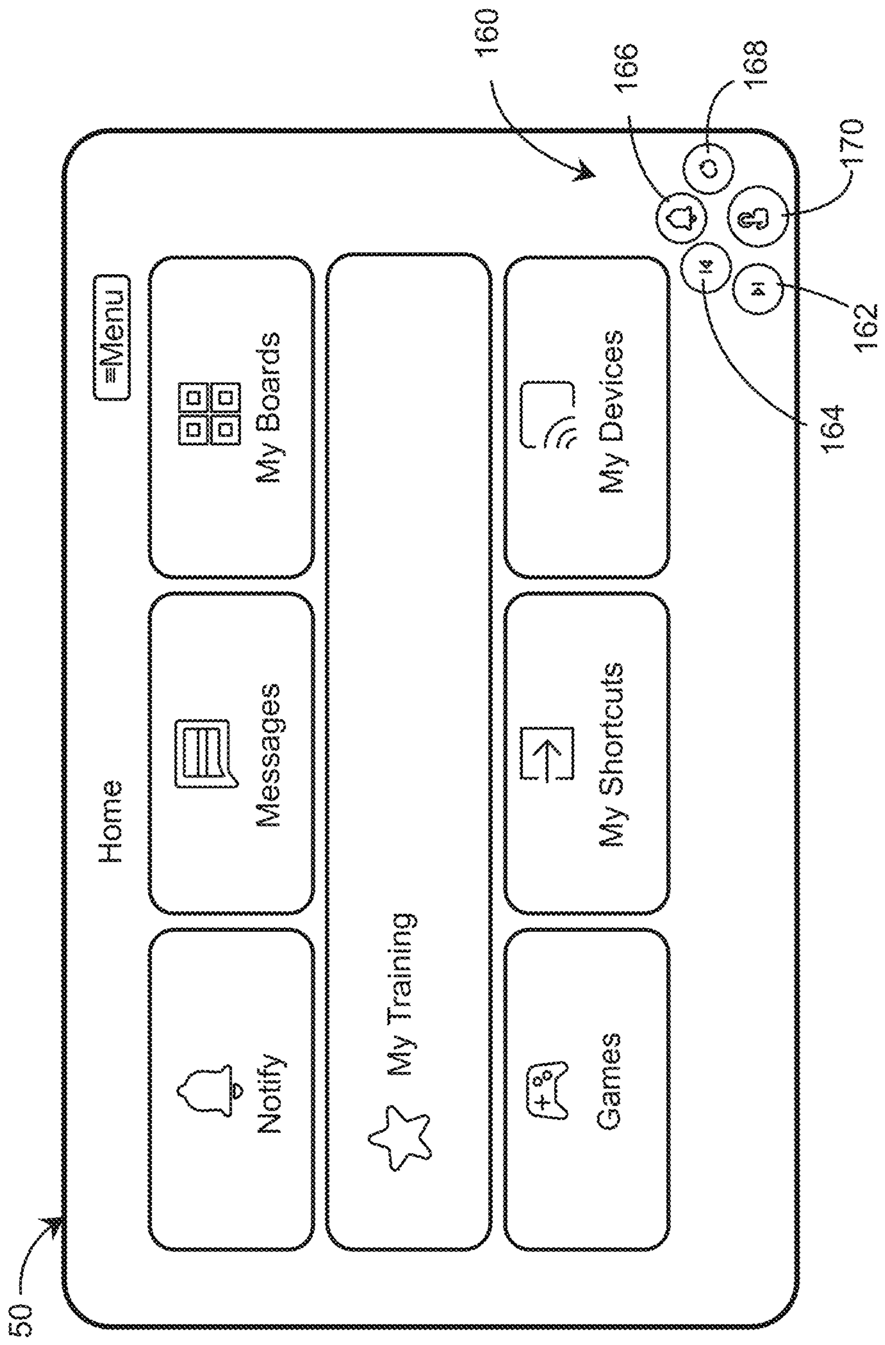
FIGS. 7A to 7D illustrate another feature of a user interface that improves the ability of a user to access digital effectors by providing a plurality of digital effectors in a heads-up-display configuration.

FIGS. 7A to 7D illustrate another feature of a user interface 50 that improves the ability of a user to access digital effectors 162-170. As shown in FIG. 7A, the user interface 50 includes a standardized interface design pattern to simplify (BCI) effector feedback and reinforce multi-effector usage. Once a user builds multiple digital effectors, it is difficult to remember what action each effector and the resulting DMO performs when used. To provide the user with independence, as opposed to a constant need for caregiver intervention, the user interface 50 can include a heads-up-display "HUD" 160 comprising any number of effectors 162-170 that are configured to respond to an intentional brain signal from the user. The use of a HUD prevents the user from having to remember multiple effectors, which can be very cognitively taxing as it requires intense concentration, especially during extended use. The effectors can also require action at precise time intervals, and the lack of feedback makes it difficult for the user to respond within those time intervals. Discrete and continuous effectors require unique feedback for the patient to be able to use them successfully during utilization.

Figure 7B:
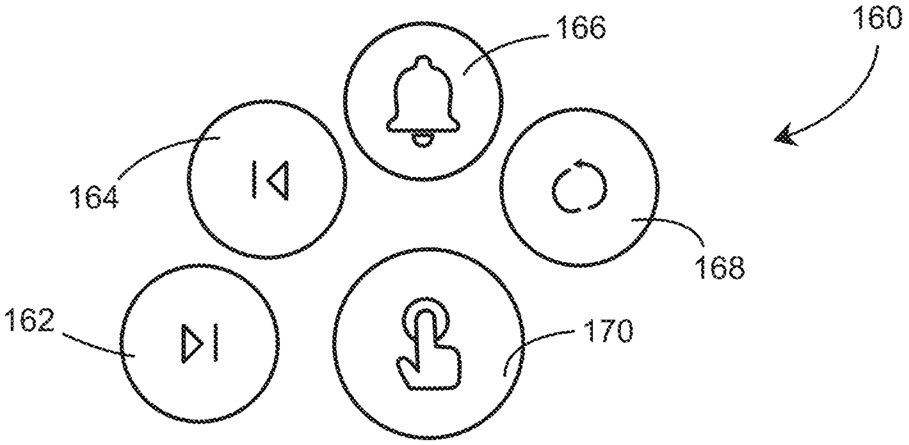
Figure 7C:
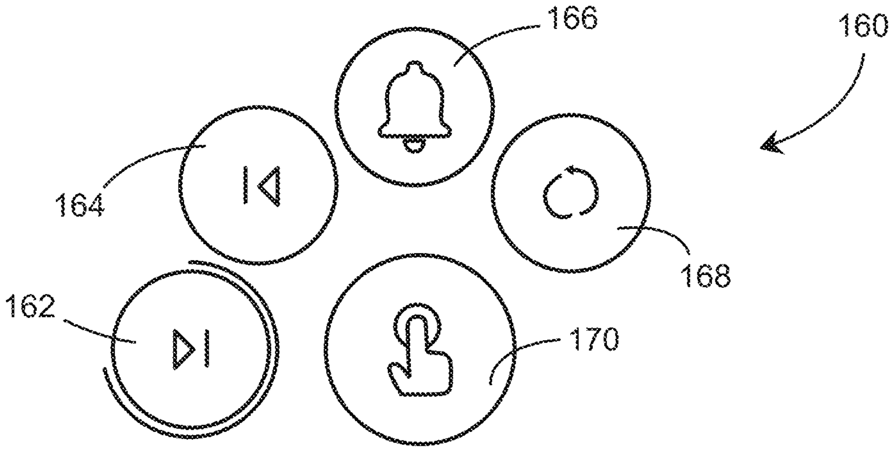
Figure 7D:
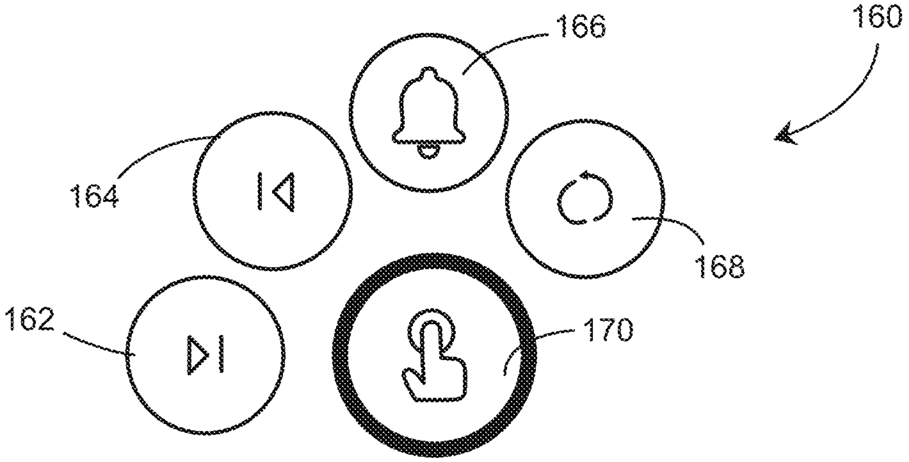

When a user configures a digital effector 162-170 associated with a DMO, that effector can be represented in the heads-up display 160. The heads-up display 160 is created using effector components 162-170, which can also provide feedback based on the inputs the BCI receives. In an initial or ready state, as shown in FIG. 7B, the effectors 162-170 can remain visible. Once an individual triggers the effector, a timing indicator, as noted above, can appear about an informational graphic of the effector, see, for example, effector 162 in FIG. 7C. The timing indicator of the effector 162 provides feedback to the user. When an action is triggered and a DMO is generated, the effector can be highlighted to confirm that the effector and associated DMO were generated, see for example, effector 170 in FIG. 7D.

This solution of a heads-up display that provides real-time feedback to the user while using their BCI switches in a utilization environment. This can also provide information about whether a patient's intent is aligned with the switch action, which reinforces training. It was found that the HUD 160 reduces the cognitive fatigue felt by the patient from constant guesswork regarding the switch they have attempted to use. The heads-up display can display the actions associated with both discrete and continuous switches. The heads-up display can appear on any portion of a BCI user interface.

It is noted that any of the graphics discussed above, including but not limited to the image graphic, the target graphic, the timing indicator, the orbit path (when visible), or any other part of the digital effectors can be visibly altered using color, show/hide options, fill, size, location, size, pulsed appearance, vibration appearance, oscillating appearance, rotation, etc. to provide ease of visualization for the user.

As for other details of the present invention, materials and manufacturing techniques may be employed within the level of those with skill in the relevant art. The same may hold true with respect to method-based aspects of the invention in terms of additional acts that are commonly or logically employed. In addition, though the invention has been described in reference to several examples, optionally incorporating various features, the invention is not to be limited to that which is described or indicated as contemplated with respect to each variation of the invention.

Various changes may be made to the invention described and equivalents (whether recited herein or not included for the sake of some brevity) may be substituted without departing from the true spirit and scope of the invention. Also, any optional feature of the inventive variations may be set forth and claimed independently, or in combination with any one or more of the features described herein. Accordingly, the invention contemplates combinations of various aspects of the embodiments or combinations of the embodiments themselves, where possible. Reference to a singular item, includes the possibility that there are plural of the same items present. More specifically, as used herein and in the appended claims, the singular forms "a," "and," "said," and "the" include plural references unless the context clearly dictates otherwise.

It is important to note that where possible, aspects of the various described embodiments, or the embodiments themselves can be combined. Where such combinations are intended to be within the scope of this disclosure.

We claim:

1. A method for assisting an individual using a brain-computer interface to produce a digital motor output to interact with an electronic device operatively coupled to the brain-computer interface, the method comprising:

providing a visual display to the individual on a user interface of the brain-computer interface;

displaying a digital effector on the visual display, where the digital effector comprises an informational graphic specific to the digital effector and a timing indicator;

positioning a target graphic on or adjacent to an orbit path of the informational graphic;

moving the timing indicator relative to the orbit path when the individual generates an intentional brain signal specific to the digital effector while maintaining the target graphic stationary relative to the digital effector;

producing the digital motor output when both the timing indicator aligns with the target graphic; and transmitting the digital motor output to the electronic device.

2. The method of claim 1, where the orbit path of the informational graphic is spaced a distance from a perimeter of the informational graphic.

3. The method of claim 1, where the target graphic comprises a visual representation of the orbit path.

4. The method of claim 1, where the timing indicator comprises a single digital image that rotates about the informational graphic by moving along the orbit path.

5. The method of claim 1, where the timing indicator comprises a continuous digital image that sweeps about the informational graphic.

6. The method of claim 1, where the timing indicator expands radially from the informational graphic.

7. The method of claim 1, further comprising a non-target graphic displayed on or adjacent to the digital effector such that the non-target graphic will not produce a digital motor output.

8. The method of claim 7, wherein further comprising converting the non-target graphic to the target graphic.

9. The method of claim 1, wherein the informational graphic comprises a circular outline.

10. The method of claim 1, wherein the informational graphic comprises a non-circular outline.

11. The method of claim 1, wherein the digital effector is part of a plurality of digital effectors, where the plurality of digital effectors are displayed on the visual display.

12. The method of claim 1, where the informational graphic comprises a text, an icon, an or an image.

13. The method of claim 1, where the digital effector moves relative to the user interface.

14. The method of claim 1, where the digital effector is stationary on the user interface.

15. The method of claim 1, where the informational graphic contains information to inform the individual of how to generate the intentional brain signal.

16. A brain-computer interface for enabling an individual to produce a digital motor output to interact with an electronic device operatively coupled to the brain-computer interface, the brain-computer interface comprising:

a visual display on a user interface of the brain-computer interface;

where the brain-computer interface is configured to display a digital effector on the visual display, where the digital effector comprises an informational graphic displaying information to the individual of how to generate an intentional brain signal and a timing indicator;

wherein the brain-computer interface positions a target graphic on or adjacent to an orbit path of the informational graphic and moves the timing indicator relative to the orbit path when the individual generates the intentional brain signal while maintaining the target graphic stationary relative to the digital effector;

wherein when both the timing indicator aligns with the target graphic and the brain-computer interface detects an intentional brain signal from the individual, the brain-computer interface produces a digital motor output and transmits the digital motor output to the electronic device.

17. The brain-computer interface of claim 16, where the orbit path of the informational graphic is spaced a distance from a perimeter of the informational graphic.

18. The brain-computer interface of claim 16, where the target graphic comprises a visual representation of the orbit path.

19. The brain-computer interface of claim 16, where the timing indicator comprises a single digital image that rotates along the orbit path.

20. The brain-computer interface of claim 16, where the timing indicator comprises a continuous digital image that sweeps about the informational graphic.

21. The brain-computer interface of claim 16, where the timing indicator expands radially from the informational graphic.

22. The brain-computer interface of claim 16, further comprising a non-target graphic displayed on or adjacent to the digital effector such that the non-target graphic will not produce a digital motor output.

23. The brain-computer interface of claim 22, wherein further comprising converting the non-target graphic to the target graphic.

24. The brain-computer interface of claim 16, wherein the informational graphic comprises a circular outline.

25. The brain-computer interface of claim 16, wherein the informational graphic comprises a non-circular outline.

26. The brain-computer interface of claim 16, wherein the digital effector is part of a plurality of digital effectors, where the plurality of digital effectors are displayed on the visual display.

27. The brain-computer interface of claim 16, where the informational graphic comprises a text, an icon, an or an image.

28. A method for assisting an individual using a brain-computer interface to produce a plurality of digital motor outputs to interact with one or more electronic devices operatively coupled to the brain-computer interface, the method comprising:

providing a visual display to the individual on a user interface of the brain-computer interface;

displaying a plurality of digital effectors on the visual display, where each of the plurality of digital effectors comprises an informational graphic unique to each of the plurality of digital effectors and a timing indicator;

positioning a target graphic on or adjacent to an orbit path of the informational graphic;

for at least one digital effector of the plurality of digital effectors, moving the timing indicator relative to the orbit path while maintaining the target graphic stationary relative to the at least one digital effector;

producing a unique digital motor output when both the timing indicator aligns with the target graphic and the brain-computer interface detects an intentional brain signal from the individual; and transmitting the unique digital motor output associated with the at least one digital effector to the one or more electronic devices.

* * * * *